Figure 1:
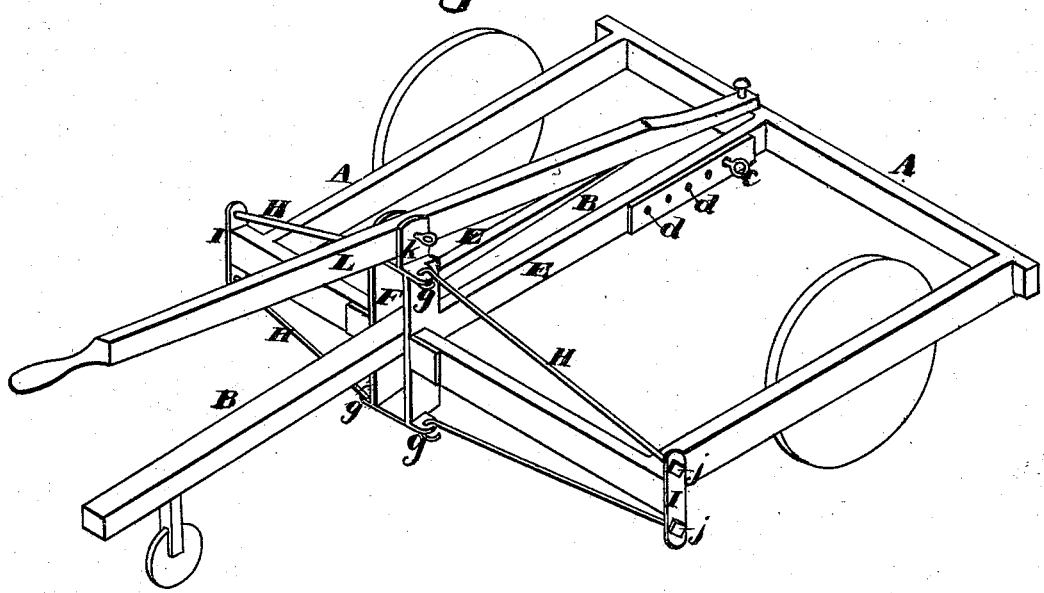

J. F. PLACE.
HARVESTER.

No. 173,336.

Patented Feb. 8, 1876.

Witnesses
Geo. H. Strong
Jno. L. Borne

Inventor
James F. Place
by Drury & Co
Attys.

UNITED STATES PATENT OFFICE.

JAMES F. PLACE, OF SAN FRANCISCO, CALIFORNIA.

IMPROVEMENT IN HARVESTERS.

Specification forming part of Letters Patent No. 173,336, dated February 8, 1876; application filed June 8, 1875.

*To all whom it may concern:*

Be it known that I, JAMES F. PLACE, of San Francisco city and county, State of California, have invented an Adjusting Attachment for Headers; and I do hereby declare the following description and accompanying drawings are sufficient to enable any person skilled in the art or science to which it most nearly appertains to make and use my said invention without further invention or experiment.

My invention relates to an improvement in headers; and it consists of an attachment by which I am enabled to retain the point of draft at the front of the machine, and in a line with the pole, whatever change may be made in the elevation of the sickle-bar and cutter for high or low grain.

Referring to the accompanying drawing for a more complete explanation, Figure 1 is a perspective view of my device.

In the construction of headers which are driven by a team of horses attached to a pole projecting behind the header-frame, this pole is usually hinged to the rear of the frame, either permanently or by means of adjusting-plates. In the former case, whenever the cutters are depressed by raising the adjusting-lever, an obtuse angle is formed between the pole and the header-frame, thus making a sort of knee-lever, against which the adjusting-lever must be moved by a great outlay of strength. If adjusting-plates are used, it will be manifest that they would be practically useless in grain which varies in strength in different parts of the same field.

In my invention, A is a header-frame, which supports the cutters and carrying-belt at the front.

The pole B is extended to the very front of the machine, where it is hinged or pivoted at C, between plates having the holes *d*, so that the pole may be adjusted forward or back. In order to allow the pole to extend to the front of the header-frame, two central cross-timbers, E E, are secured as a part of the frame at such a distance apart as to just admit the pole to work between them. The rear timber of the frame is made in two parts extending just to the space within which the pole works. In order to strengthen this part sufficiently, a stout rectangular metal yoke, F, is fixed in the space between the ends of these rear timbers, and the pole passes through this yoke, which presents an opening high enough to allow the header-frame to be moved up and down as much as may be necessary. At the top and bottom of this yoke strong eyes *g* are suitably formed to receive the hooks ends of the rods H. These rods extend from the four corners of the yoke to the ends of the rear timber of the frame, where they pass through a stout plate, I, and either by turn-buckle or set-nut, *j*, sufficient tension is given to these rods to make the frame fully as strong as if its rear timber were made in one piece.

Two lugs, *k*, upon the top of the yoke F serve to hold the fulcrum-pin of the operating-lever, L, which extends from the front of the machine, back above the pole in the usual manner.

By this construction it will be seen that I change the fulcrum or point of support about which the header-frame works from the rear to the front, and by this change the adjustment of the cutters for high or low grain is easily effected, and without the outlay of much strength.

Having thus described my invention, what I claim as new, and desire to secure by Letters Patent, is—

In a header-frame, the operating-lever L, in combination with the pole B, connected or pivoted to the frame at a point, C, near the front, substantially as and for the purpose herein described.

In witness whereof I hereunto set my hand and seal.

JAS. F. PLACE. [L. S.]

Witnesses:
GEO. H. STRONG,
JNO. L. BOONE.